United States Patent [19]

Kirk, Jr.

[11] 4,079,376
[45] Mar. 14, 1978

[54] TARGET DETECTION SYSTEM IN A MEDIUM PRF PULSE DOPPLER SEARCH/TRACK RADAR RECEIVER

[75] Inventor: John C. Kirk, Jr., Santa Barbara, Calif.

[73] Assignee: Westinghouse Electric Corporation, Pittsburgh, Pa.

[21] Appl. No.: 665,348

[22] Filed: Mar. 9, 1976

[51] Int. Cl.$^2$ ............ G01S 9/02; G01S 9/06; G01S 9/42
[52] U.S. Cl. .................... 343/7 A; 343/7.7; 343/55 M; 343/17.1 PF
[58] Field of Search ............ 343/55 M, 7.7, 17.1 PF, 343/7 A, 8

[56] References Cited

U.S. PATENT DOCUMENTS

| | | | |
|---|---|---|---|
| 3,023,409 | 2/1962 | Smith et al. | 343/7.7 X |
| 3,113,308 | 12/1963 | Stavis | 343/7 A X |
| 3,404,399 | 10/1968 | Eschner, Jr. | 343/8 X |
| 3,587,097 | 6/1971 | Stull, Jr. | 343/7 A |
| 3,701,149 | 10/1972 | Patton et al. | 343/7.7 X |
| 3,707,718 | 12/1972 | Ames | 343/7.7 |
| 3,721,977 | 3/1973 | Darboven | 343/8 X |
| 3,797,016 | 3/1974 | Martin | 343/7.7 |
| 3,949,398 | 4/1976 | Donahue | 343/55 M X |

*Primary Examiner*—Malcolm F. Hubler
*Attorney, Agent, or Firm*—H. W. Patterson

[57] ABSTRACT

In a medium PRF pulse doppler type radar receiver, target detection is achieved in both search and track modes. In the search mode, the video signal from the receiver section is notch filtered to cancel the main beam clutter. The remainder of the signal is threshold detected, followed by ranging each of the thresholded signals to resolve the range ambiguity of the signals. The unambiguous signals are gated through a range sensitive threshold which operates along a power curve of $R^4$, resulting in true target returns being thresholded by the range sensitive threshold circuit and blocking out discrete sidelobe returns. In the track mode, the video signal from the receiver is clutter cancelled to remove main beam clutter, as in the search mode, and the remaining signals pass through a velocity track filter with a narrow band window. The true target return signal ranged during the search mode, is passed by the velocity track filter which is adjusted to match the true target return doppler shift during the correct range gate. The velocity track filter is controlled to track the true target return signal and is narrow enough to reject discrete sidelobe signals which occur in the same range cell. The signals passed by the velocity track filter are subsequently monitored, and guard gates are established in both adjoining range cells to insure that lock on the tracked target will not be lost due to interfering signals such as returns from moving ground targets. When the interfering signals are detected in the guard gates, the system goes on memory until the interfering signal passes.

19 Claims, 8 Drawing Figures

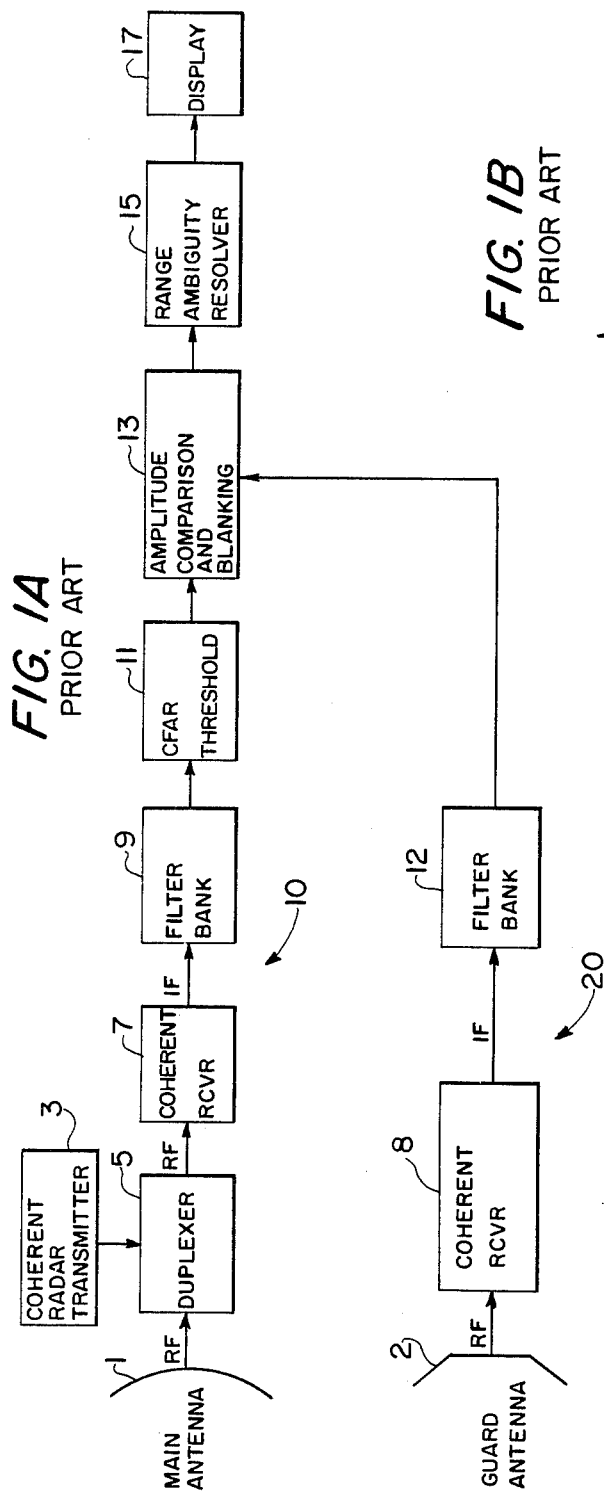
FIG. 1A PRIOR ART
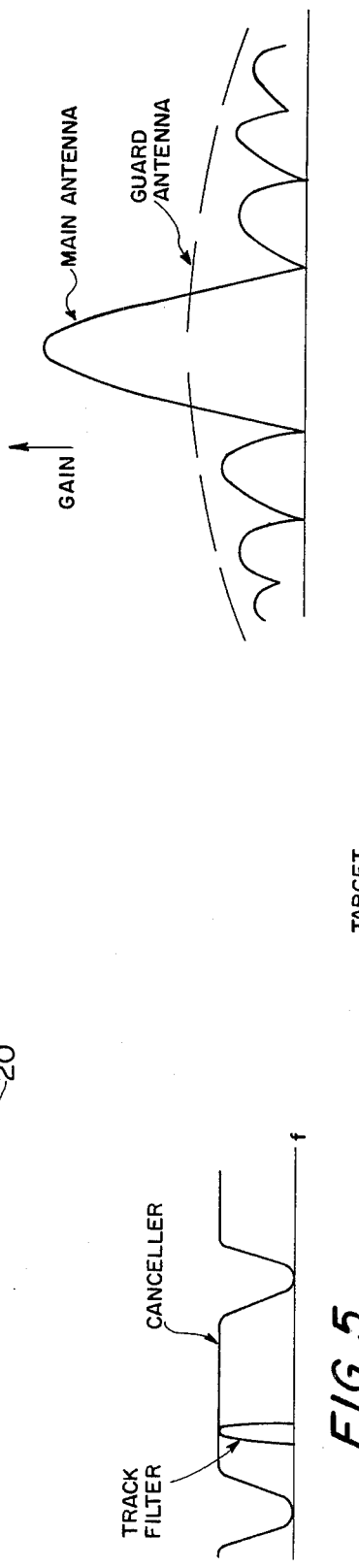
FIG. 1B PRIOR ART
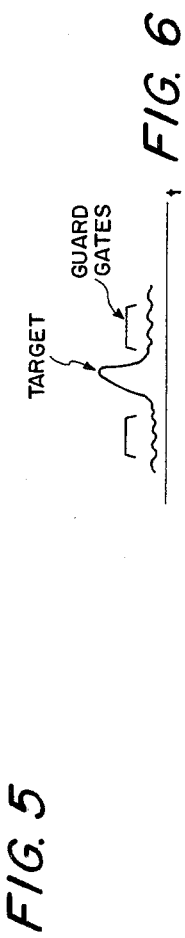
FIG. 5
FIG. 6

TARGET DETECTION SYSTEM IN A MEDIUM PRF PULSE DOPPLER SEARCH/TRACK RADAR RECEIVER

The invention herein described was made in the course of or under a contract or subcontract thereunder with the Department of the Air Force.

BACKGROUND OF THE INVENTION

1. Field of the Invention

The present invention is in the field of radar receivers employing post detection processing techniques to determine target information. Such radar receivers are generally employed in the area of MTI radars, normally mounted on aircraft, and operate in either search or track modes.

2. State of the Prior Art

In the prior art, the problem of rejecting ground clutter received through the main beam without rejecting true targets and the problem of distinguishing near range point clutter received through the sidelobes from true targets received through the main beam have been persistent.

A medium PRF pulse doppler (PD) type radar is characterized by having an ambiguous range measurement, for each received pulse. By contrast, in a low PRF system, the time period between each pulse transmitted therein allows time for the transmitted pulse to be reflected from a within-range target and to be received by the receiver before the next pulse is transmitted. Therefore, in a low PRF system, the range is unambiguous since the time between the transmitted pulse and the corresponding received signal is known. However, in a medium PRF system, the transmitter transmits a pulse, and prior to the pulse having time to be returned by a within-range target, a subsequent pulse is transmitted. The inter-pulse period (time between each transmitted pulse) in the medium PRF system is shorter than that for the low PRF system. Therefore, pulses received by the radar receiver in a medium PRF system are ambiguous in range, since the return signal may occur in an inter-pulse period subsequent to the period following the corresponding transmitted pulse.

The medium PRF system is useful, however, since a doppler shift can be detected in each returned signal. Each transmitted pulse is coherent with respect to every other transmitted pulse, and the PRF frequency is high enough to monitor high or low speed doppler shifts in the returned signals, allowing valuable information to be derived. The presence of doppler shift in the return signals provides an additional basis for distinguishing the return signal and determining if it is from a true target, main beam clutter, sidelobe clutter or ground moving targets.

In a typical prior art radar receiver as is shown in FIG. 1A, two separate receiver channels 10 and 20 are used in order to distinguish the true target return from main beam clutter and sidelobe clutter in a medium PRF system. A main channel coherent receiver 7 is connected through a duplexer 5 to the main antenna 1. The main antenna 1 is an antenna characterized by having a high gain directional main beam reception response and a low gain sidelobe reception response, as is shown in FIG. 1B. A separate guard receiver channel 20 includes a coherent receiver 8 connected to a guard antenna 2. The guard antenna 2 is separate from the main antenna and, as shown in FIG. 1B, has a characteristic broad beam response with a gain which is higher than any sidelobe of the main antenna and a gain which is lower than the main beam of the main antenna. The guard channel 20 will necessarily receive the same information as does the main channel 10. However, due to the construction of the respective main antenna and guard antenna, signals received in the main beam of the main antenna 1 are received with a higher amplitude than are corresponding signals which are received in the guard antenna 2. Correspondingly, sidelobe return signals received in the main antenna sidelobes are of a lower amplitude than the corresponding sidelobe return signals received by the guard antenna. Typically, the main channel 10 and the guard channel 20 contain filter banks 9 and 12 respectively. These filter banks are effective in acting as main beam clutter rejectors by filtering the output of the corresponding coherent receivers 7 and 8, and rejecting signals which are doppler shifted by an amount corresponding to the stationary clutter targets in the main beam with respect to the speed of the radar-carrying aircraft. Since the main beam clutter has a predictable doppler shift determined by the speed of the radar-carrying aircraft with respect to the stationary clutter targets in the main beam, only signals which are doppler shifted away from the main beam clutter frequency are passed through the filter banks in each channel.

Sidelobe clutter results from ground and object reflections of signals which are received in the sidelobes. Discrete clutter (also called point clutter) is a high amplitude return which occurs when a transmitted pulse reflects off a building or similar structure and is reflected back to the aircraft. When such a strong return occurs in the sidelobes (discrete sidelobe clutter) the doppler shift is different from the main beam returns. Therefore, since sidelobe clutter is shifted differently than main beam clutter, it will be passed by the filter banks in each channel along with any true target return signals. As discussed previously, due to the antenna characteristics, the guard channel 20 receives the sidelobe clutter with a higher amplitude than does the main channel 10. On that principle, the prior art embodiment shown in FIG. 1A, operates so that the detection of the sidelobe clutter in the guard channel 20 is used to cancel or blank out the correspondingly detected clutter which occurs in the sidelobes in the main channel 10. Since main beam clutter is removed by the filter bank 9, only the true target returns from the main beam, and the area and discrete clutter from the sidelobes and noise are passed by the filter bank 9. These signals are fed into a conventional constant false alarm rate (CFAR) threshold circuit 11. The CFAR threshold circuit has an adaptive threshold level which raises or lowers to block out area sidelobe clutter, but is ineffective against strong discrete sidelobe clutter signals.

The guard channel 20 normally receives the true target returns at an amplitude far reduced from that of the main beam reception, and the effect of the guard channel is to cause cancellation of only the discrete sidelobe clutter returns since these signals in the guard channel are higher than the sidelobe reception in the main channel 10. The output of the guard channel 20 is fed into the amplitude comparison and blanking circuit 13, wherein the amplitudes of the discrete doppler shifted signals corresponding in frequency are compared. Where the amplitude of the guard channel signal exceeds the corresponding signal amplitude in the main channel, that discrete frequency is blanked. Following the blanking operation, the range ambiguity resolver 15 receives the true target signals which are ambiguous in range, and resolves the range. If a plurality of different PRF's are transmitted, the resolver 15 divides the PRF's into a predetermined number of range cells and correlates the reception in corresponding range cells of each PRF. The signals which occupy corresponding range cells in each of the other PRF's are correlated, and the true target return signal is assigned to a range cell common to each PRF, thereby resolving the range ambiguity. The target is then displayed in a conventional manner on a PPI display, according to the resolved unambiguous range measurement, etc.

Problems with the prior art guard channel receiver system as described heretofore are obvious, since the guard channel involves a separate antenna and receiver system resulting in a duplication of hardware and instrumentation, which is not only expensive but adds additional weight to an aircraft environment.

SUMMARY OF THE INVENTION

The present invention is directed to improving the problems in the prior art by providing a single channel receiver, wherein sidelobe discrete clutter is elminated and range ambiguity of true targets is resolved by processing the received signals, without the use of a separate guard channel.

The present invention operates in the medium PRF range in both a search and track mode, wherein a plurality of medium PRF's of different frequency are transmitted in a time shared arrangement during the search mode and a single predetermined medium PRF is transmitted during the track mode.

In the search mode, a video signal from the single channel receiver is fed into circuitry which removes the clutter signal occuring at a predetermined doppler shift for each corresponding PRF. The remaining doppler shifted signals are envelope detected, integrated and threshold detected to only allow signals exceeding a certain amplitude and which recur at each discrete doppler shifted frequency to be further processed. Those signals which exceed a predetermined threshold will be those which constantly recur in each PRF (i.e., true target reflections in the main beam and discrete clutter reflections in the sidelobes). The signals which exceed the predetermined threshold remain ambiguous in range and each has a characteristic amplitude. A ranging circuit detects each of the doppler shifted signals which exceed the predetermined threshold for a plurality of PRF's and resolves the ambiguous range of the true target return signals and the discrete sidelobe clutter signals by assigning an unambiguous range cell to each correlated signal. The ranging circuit then generates range gating signals corresponding to the assigned range cells. The amplitudes of the ambiguous signals are gated by the range gating signals and are then amplitude compared with a range sensitive threshold value operating on a $R^4$ power curve, which decreases with respect to increased range. The $R^4$ power curve is set so as to be higher than the amplitude of the umambiguous close-in discrete clutter signals received through the sidelobes and lower than the amplitude of signals received from true targets in the main beam. Therefore, signals which represent true targets have doppler shifts exceeding the predetermined doppler shift of the stationary clutter reflected in the main beam and have amplitudes which when gated to the corresponding unambiguous range cells by the range gating signals exceed the $R^4$ power curve. Although discrete clutter return signals occuring in the sidelobes are processed by the ranging circuit and are also gated by a range gating signal, they occur at the lower ranges and are of insufficient amplitude to exceed the $R^4$ power curve threshold.

In the search mode, the present invention serves to eliminate the guard channel and at the same time distinguish true targets in the main beam from main beam clutter and sidelobe discrete clutter.

In the track mode, the present invention maintains lock on a selected true target signal, the range of which has been determined during the search mode, and whose azimuth is determined by the monitored position of the main beam when reflection is received from the target.

A narrow band track filter and guard range gates are used to eliminate the effects of sidelobe point clutter. In the tracking mode, a single PRF is transmitted by the radar transmitter, allowing the returned signal from the selected true target to occur in a predictable range cell during each inter-pulse period. Therefore, the narrow band track filter is gated at the predetermined range cell (ambiguous) in which the target signal lies. During acquisition of the selected target signal, the narrow band track filter is swept through the ambiguous doppler window, until detection occurs. After acquisition is achieved, tracking of the target is maintained through subsequent doppler shift changes. The system discriminates against targets of different doppler frequencies by tracking with a narrow band window in the track filter. Therefore, the narrow band track filter discriminates between the doppler shift of the true target and the doppler shift of any discrete sidelobe clutter having an ambiguous range which may occur in the same range cell. The tracking of a particular target signal in a particular range cell eliminates all other true targets and discrete sidelobe clutter which may occur in the other range cells.

Moving ground targets which are a part of the main beam clutter, but which produce returned signals with doppler shifts exceeding the main beam clutter, may pass through the same range cell as the tracked target. If this occurs, the moving ground clutter signal is detected by guard gates in adjoining range gates on both sides of the tracked target and the tracking of the target will be suspended until the moving ground clutter return signal moves out of the guarded range cells.

It is an object of the present invention to provide a single channel medium PRF pulse doppler type radar receiver which operates in both search and track modes without the use of a guard channel.

Another object of the present invention is to provide a single channel processing system for a medium PRF pulse doppler type radar receiver which distinguishes true targets from main beam clutter and discrete sidelobe clutter.

A further object of the present invention is to provide rejection of ground clutter in a medium PRF type radar receiver carried by high speed aircraft.

It is also an object of the present invention to provide a receiver system which will track true targets and reject both main beam clutter and discrete sidelobe clutter.

BRIEF DESCRIPTION OF THE DRAWINGS

FIG. 1A is a block diagram of a prior art radar receiver incorporating a guard channel.

FIG. 1B is a diagram illustrating the relative gain characteristics of the main antenna and the guard antenna shown in FIG. 1A.

FIG. 5 is a frequency response plot comparing the velocity track filter response to that of the clutter canceller shown in FIG. 3.

FIG. 6 is a range plot showing an example of a tracked target signal and the two neighboring guard gates which are employed in the tracking section shown in FIG. 3.

DETAILED DESCRIPTION OF THE INVENTION

In a medium PRF pulse doppler-type radar receiver, signals are generally classified as main beam clutter, noise, area sidelobe clutter, discrete sidelobe clutter, and true targets. The present invention succeeds in distinguishing true targets from all the other classifications of signals in a search mode, and is able to track a selected true target through the other classifications of signals in a track mode.

Figure 2:
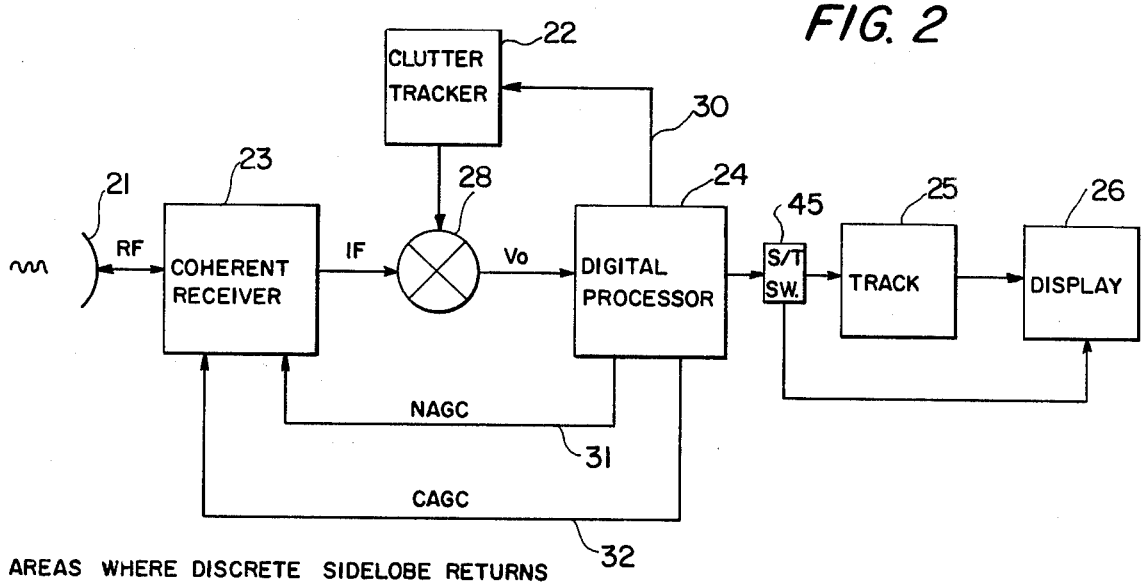
FIG. 2 is a block diagram showing a single channel radar receiver used in the present invention.

FIG. 2 is a block diagram illustrating a single channel radar reciever of a type which employs the present invention. For convenience, the transmitter/duplexer sections are not shown. A directional antenna 21 receives the returned signals correspondingly transmitted at a medium PRF rate. Since each of the plurality of medium PRF rates are separately transmitted in a time-shared arrangement, the corresponding return signals for each PRF are received in the same corresponding time-shared fashion. PRF signals received by the antenna 21 are amplified by the coherent receiver 23 and reduced to an IF frequency in a conventional manner. The coherent receiver 23 receives both a noise automatic gain control (NAGC) signal 31 and a clutter automatic gain control (CAGC) signal 32, from a digital processor 24, to be described later. The IF signal from the coherent receiver 23 is fed to a mixer 28. The IF output of the coherent receiver 23 is mixed with the output of a clutter tracker circuit 22. The clutter tracker 22 comprises a variable frequency oscillator and is responsive to the output of a zero frequency discriminator 36 (FIG. 3), which supplies a control signal along line 30. The output of the mixer 28 is a bipolar video signal $V_0$ which is then fed into the digital processor 24. The digital processor 24 rejects the clutter, detects the presence of the incoming video signal $V_0$, supplies target position information to the conventional display section 26 and supplies tracking information to the tracker section 25, via the search/track mode switch 45. The resulting output from the tracker section 25 may be fed to a conventional display section 26 for presentation to the operator, or to a utilization control device. Neither the display section or a utilization device are a part of the present invention, but are only shown to illustrate a complete receiver system. Although the signal between the tracker 25 and the display section 26 is shown as a single line in FIG. 2, that connection line is understood to represent various instructive signals such as those representing the range and angle of the tracked target, when the system is in the track mode, and those representing information about various target locations over the full scanning range when the system is in the search mode.

The digital processor 24 and the track section 25 are shown in the detailed block diagram of FIG. 3 and are now described below. The video signal $V_0$ from the mixer 28 enters the digital processor 24 via input 34. A zero frequency discriminator 36 monitors the video signal $V_0$ and produces a controlling signal along line 30 to the clutter tracker 22 (FIG. 2). This feedback signal 30 from the zero frequency discriminator 36 is used to maintain the main beam clutter in the video signal $V_0$ at a frequency which will be notched and cancelled in the digital processor 24.

A clutter automatic gain control circuit 38 also receives the input signal $V_0$ and supplies a CAGC control signal 31 to the coherent receiver 23 which prevents the main beam clutter from saturating the receiver. The purpose of the CAGC is to obtain optimum sub-clutter visibility in the presence of heavy main beam clutter.

A noise automatic gain control circuit 40 receives the video input signal $V_0$ and supplies a control signal 32 to the coherent receiver 23 in a conventional manner to control the noise level in the receiver.

The clutter canceller 42 receives the video input signal $V_0$. The clutter canceller 42 is a notch filter having a characteristic response which rejects frequencies corresponding to the doppler shift in the return signals due to the main beam clutter. Main beam clutter return may be caused by stationary objects, ground return, rain, chaff, etc. The characteristic curve of the clutter canceller 42 is shown in FIG. 5, wherein the notch portion is seen at the lower frequencies. The clutter track loop, containing the zero frequency discriminator 36, the clutter tracker 22 and the mixer 28, monitors the video signal $V_0$ and maintains the main beam clutter in the lower frequency range so that it will be notched out by the clutter cancellor 42. Positively stated, the clutter cancellor 42 passes signals having doppler shift frequencies outside the notch zone of frequencies. It is understood that the clutter cancellor 42 may also take the form of a comb filter or a filter bank, which are well known in the art (typically described in U.S. Pat. No. 3,894,219). It is also understood that the clutter cancellor 42 may be substituted by a filter bank and a CFAR circuit, as are well known in the art (typically described in U.S. Pat. No. 3,701,149).

Figure 3:
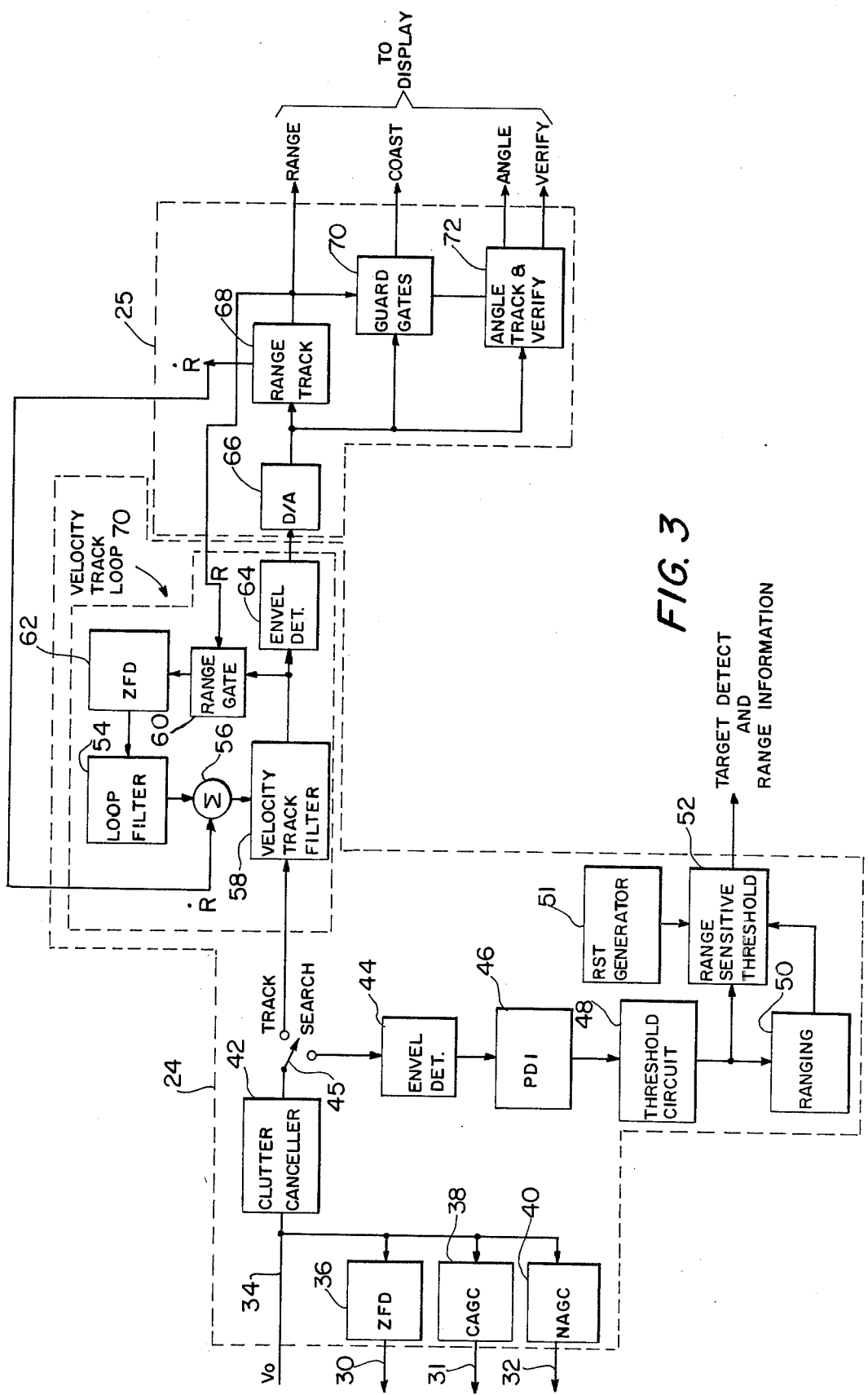
FIG. 3 is a detailed block diagram showing the signal processor embodiment of the present invention.

In FIG. 3, the output of the clutter cancellor 42 is shown connected to the input of the envelope detector 44 when the search/track mode switch 45 is in the search mode position. The envelope detector 44, a post detection integrator 46 and a threshold circuit 48 (typically described in U.S. Pat. No. 3,797,016) present those signals which recur and are of sufficient amplitude to be considered target signals ambiguous in range. However, discrete sidelobe clutter which has a doppler shift different from the cancelled main beam clutter, will also appear as target signals, and is also present at the output of the threshold circuit 48. Each signal which exceeds the threshold level in the threshold circuit 48 has an amplitude characteristic, an ambiguous doppler shift characteristic and occupies recurring range cells which are equally spaced for each transmitted PRF.

As stated previously, in the search mode, a plurality of PRF's are transmitted in time-shared fashion. Therefore, since the time between transmitted pulses is different for each PRF, the spacing between returned signals from a specific target, will necessarily be separated by a different number of range cells for each particular PRF being received.

Accordingly, if the first PRF series of pulses are transmitted at a rate of 10KHz, for example, and an in-range target reflects the transmitted pulses in the main beam, the return signal from the target will occupy the same range cell number following each transmitted pulse. Therefore, if the interpulse period is divided into 20 range cells for the 10KHz PRF, the in-range target may be ambiguously received at range cells 3, 23, 43, 63, . . ., etc., for the number of range cells monitored. If a second PRF series of pulses are transmitted at a rate of 11KHz for example, the interpulse period is divided into 18 range cells and the same in-range target may appear in range cells 5, 23, 41, . . ., etc. Upon correlation of the 2 PRF's on a range cell by range cell basis, the target signal correlates at range cell 23 and the range for that signal would be unambiguous, since the 23rd range cell would correspond to a range of approximately 34 Km (18.3 $n$ miles).

In the preferred embodiment of the present invention, two transmitted PRF's are effective to distinguish targets from discrete sidelobe clutter. However, five or six PRF's may be time-shared transmitted.

The output signals from the threshold circuit 48 are fed into the ranging circuit 50 which unfolds each PRF and produces unambiguous range cell gating signals. The ranging circuit 50 produces unambiguous range cell gating signals based upon the correlation of both the discrete sidelobe clutter signals and the target signals. The unambiguous range cell gating signals are fed into the range sensitive threshold (RST) circuit 52, which also receives the corresponding amplitude values of the ambiguous return signals from the threshold circuit 48. The unambiguous range cell gating signals, from the ranging circuit 50, gate through corresponding amplitude values of the ambiguous return signals in the RST circuit 52 and these signals are thresholded against the $R^4$ power curve generated by the RST generator 51.

Although, the close-in discrete sidelobe clutter signals have a high amplitude, they are significantly less than a true target return signal received through the main beam for the same range. Therefore, close-in discrete sidelobe clutter signals are correspondingly range gated by a low range cell; and the amplitude of the close-in discrete sidelobe clutter signals, although high, will not exceed the range sensitive threshold, since the $R^4$ power curve is set to exceed the sidelobe discrete clutter signals and set to be less than true target return signals over the entire range.

Figure 4:
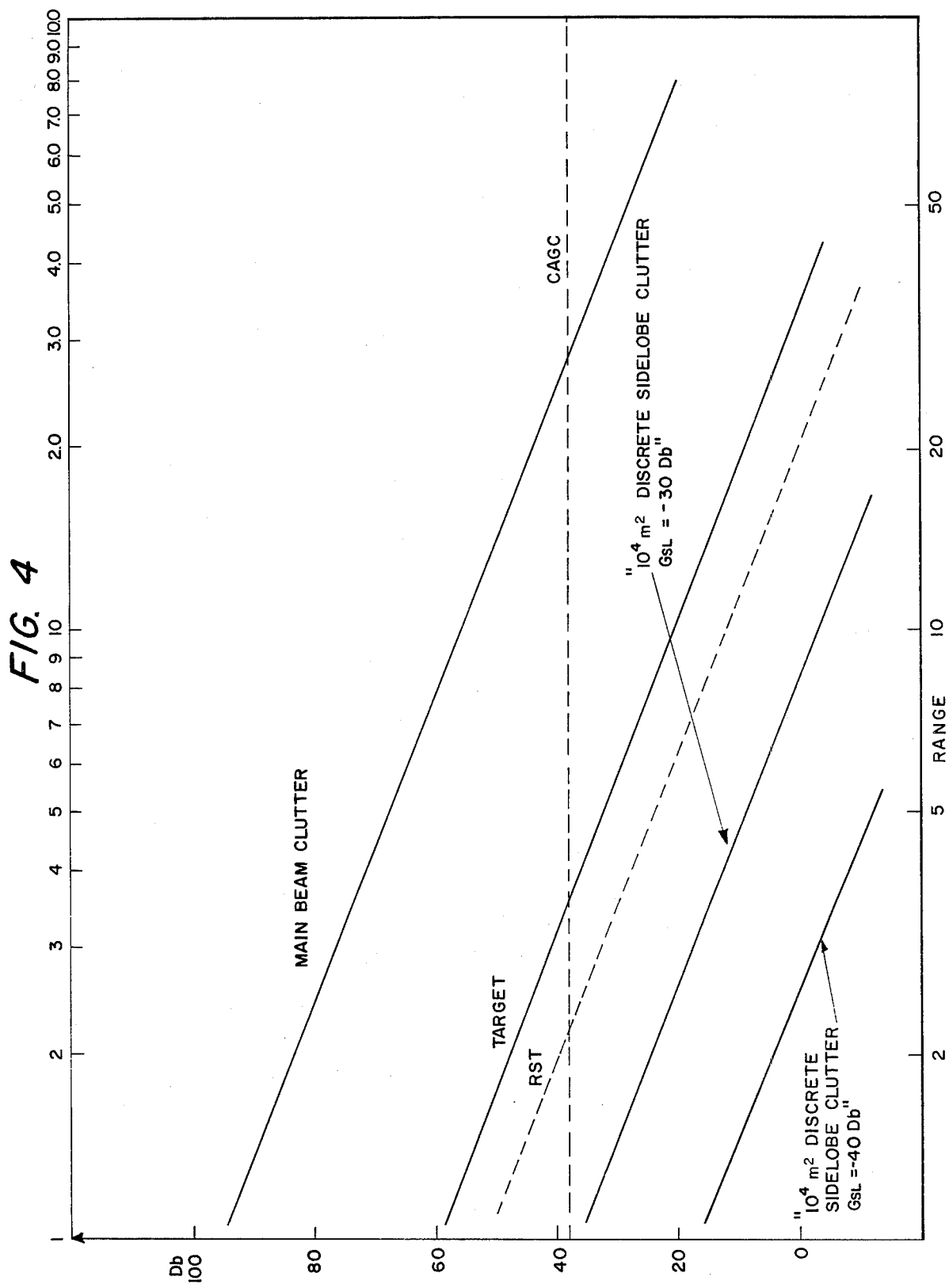
FIG. 4 is a plot of the $R^4$ power curve used in the range sensitive threshold circuit shown in FIG. 3.

The $R^4$ power curve is illustrated in FIG. 4, and shows the relative signal levels in the medium PRF pulse doppler system. The RST is shown as set to exceed the maximum discrete sidelobe clutter expected from $10^4 m^2$ return in the various sidelobes. The resulting signals from the range sensitive threshold circuit 52 are true target signals with unambiguous range information. This information is then utilized in a conventional manner for display.

Upon selection of a particular target to track, the search/track mode switch 45 is placed in the track position, and the signals from the clutter cancellor 42 are fed to the velocity track filter 58. The velocity track filter 58 is a narrow band filter having an acquisition bandwidth of, for example, 300Hz, which is swept over the ambiguous doppler window determined by the bandpass of the clutter cancellor 42. The relationship between the bandpass of the clutter cancellor 42 and the narrow band velocity track filter 58 is seen in FIG. 5, wherein the bandpass of the clutter cancellor approximates 4KHz. The velocity track filter 58 is swept by an output signal from a summing circuit 56, which receives inputs from the range rate signal R and from the velocity track loop 70. The velocity track loop 70 comprises loop filter 54, a zero frequency discriminator 62 and range gate 60.

During acquisition, the range gate 60 is controlled by the signal R which opens the range gate 60 to correspond with a preselected range cell in each interpulse period determined during the search mode as corresponding to the unambiguous range of the desired target to be tracked. Such gating assures that monitoring of the incoming signals occurs only for the range cell in which the desired target lies.

The velocity track filter 58 is a range gated closed loop ambiguous doppler tracker. The velocity track filter 58 includes a complex video mixer followed by a low-pass delay line filter. The target video is coherently mixed to "0" frequency and is narrow band filtered. The zero frequency discriminator 62 is gated at the selected range cell by the range gate 60 and senses any frequency error produced by the narrow band filter in the velocity track filter 58 due to the doppler changes. The loop filter 54 receives the output from the zero frequency discriminator 62 and smoothes out the tracking of the doppler changes in the selected target period.

During acquisition, the output from the zero frequency discriminator causes the ambiguous doppler window to be swept by the velocity track filter 58 until detection occurs during the gated range cell. After acquisition occurs, the track bandwidth of the velocity track filter is reduced to, for example, approximately 100Hz to be effective to discriminate against targets having different doppler frequencies occuring in the same range cell, but still wide enough to allow the velocity track loop 70 to follow the selected true target returns through any rapid doppler changes.

The output of the velocity track filter 58 is envelope detected by envelope detector 64 and is passed into the range tracker 25. A digital to analog converter 66 transforms the output from the envelope detector 64 to a bipolar video analog signal. The range track circuit 68 is a conventional bipolar video analog range tracker which provides an output to the display section corresponding to the range of the tracked target and also produces a range rate signal R indicating the speed at which the range of the tracked target is changing. The range rate R signal is fed to the summing circuit 56 as indicated previously.

Figure 7:
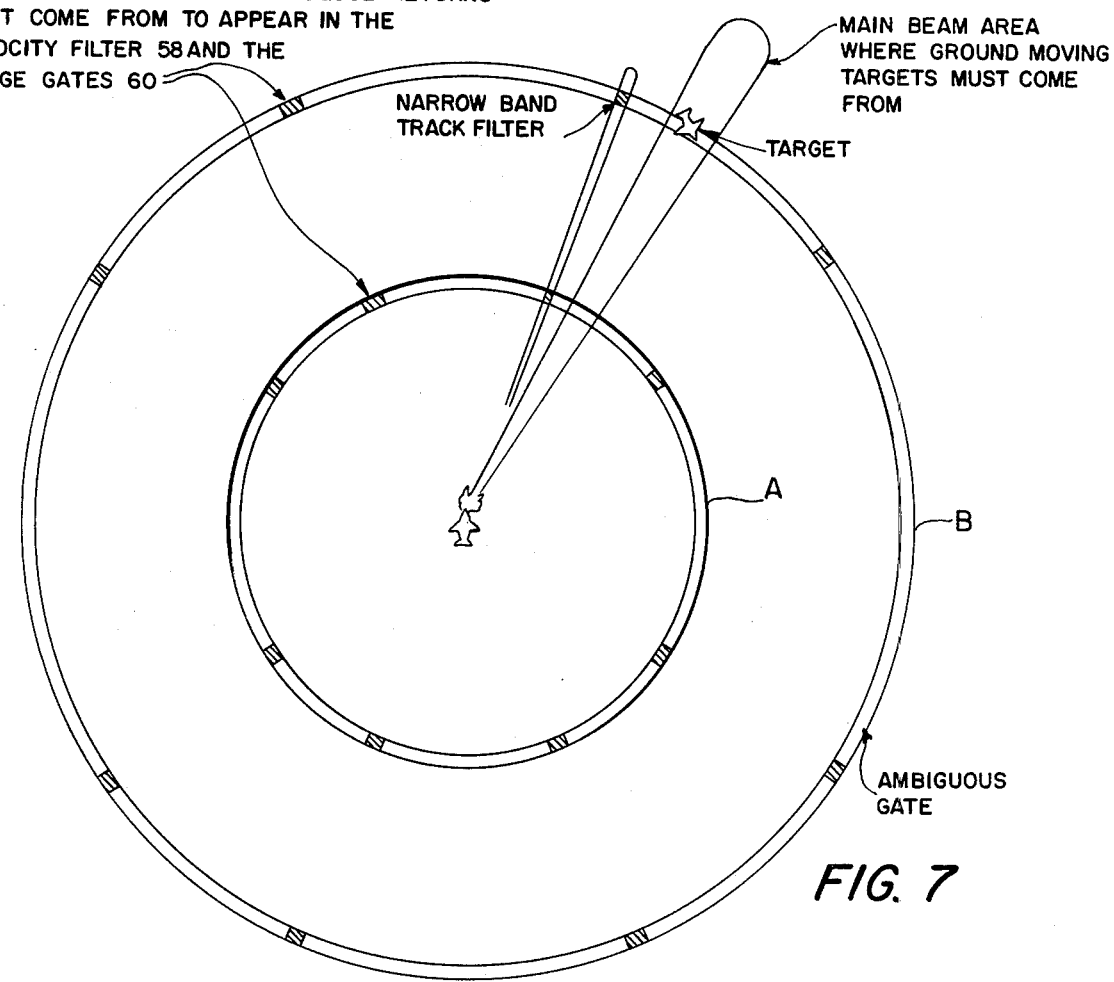
FIG. 7 is a diagram illustrating the relative positions where discrete sidelobe clutter must occur to be detected by the tracking section shown in FIG. 3.

When the receiver of the present invention is in the track mode, the tracked signal is immune to most discrete sidelobe clutter. FIG. 7 illustrates the immunity to discrete sidelobe clutter in the present invention. The ambiguous range gates A and B for a particular designated target are shown. For a PRF of 10KHz and a pulse width of 1$\mu$sec, only 1% of the possible discrete sidelobe clutter can effect tracking, since each of the range cells are the equivalent of 1 pulse width. Furthermore, with a velocity track bandwidth of 100Hz an additional immunity of 1% is obtained for a total of 0.01%. Therefore, on the average, 9,999 out of every 10,000 discrete sidelobe clutter returns will be eliminated by the present invention.

The above approach is also effective in tracking through main beam clutter in both medium and low PRF pulse doppler radar modes. If the reject notch of the clutter cancellor is narrowed in order for the narrow band track filter to track targets at doppler shift frequencies as close to main beam clutter as possible, it is possible that ground moving targets would not be filtered out by such a narrow reject notch. Ground moving target return signals may possibly enter the velocity track filter as a false target. Such a false target could cause the velocity track filter to lose lock if the ground moving target signal appears in the same range gate and approximates the doppler shift of the tracked target. To prevent this, guard gates are established by the guard gate circuit 70 on either side of the tracking gate and are used to detect the presence of interfering targets. If a signal is detected on either side of the tracked target signal, the guard gate circuit 70 causes the system to go on memory (coast), inhibiting the tracking gate 60 until the interfering signal is no longer detected by the guard gates. When the interfering signal has passed, the guard gates allow the tracking gate 60 to resume its monitoring of the selected target signal.

The angle track and verifying circuit 72 monitors the video signal of the tracked target return and determines error voltages as a function of the variation in the peak of the signal. Since the antenna nutates during tracking, any relative changes between the center of the nutation and the target can be easily detected by variations in the signal over the nutation cycle. The verification signal is an indication that the error signal is minimal and lock on is established.

It will be apparent that many modifications and variations may be effected without departing from the scope of the novel concept of this invention. Therefore, it is intended by the appended claims to cover all such modifications and variations which fall within the true spirit and scope of the invention.

What is claimed is:

1. A method of distinguishing target return signals from main beam clutter, area sidelobe clutter, and discrete sidelobe clutter signals detected with range ambiguity for at least two pulse repetition frequencies by a radar receiver, said method comprising the steps of:

filtering the detected signals to reject the main beam clutter signals which are doppler shifted within a predetermined frequency range, and to conduct all other detected signals outside said predetermined frequency range;

determining the unambiguous ranges from which said target signals and said discrete sidelobe signals were reflected by unfolding the detected signals corresponding to each pulse repetition frequency and correlating the unfolded signals to provide gating signals corresponding to said unambiguous ranges;

generating a thresholding signal as a function of the unambiguous range determined for said signal reflector;

gating the target signals and the discrete sidelobe signals outside said predetermined frequency range in accordance with said unambiguous range gating signals; and thresholding the amplitude of said gated signals against said thresholding signal to produce output signals corresponding to target returns received by said radar receiver.

2. A method as in claim 1 wherein the conducted signals are thresholded after said step of filtering to eliminate noise and area sidelobe clutter signals.

3. A method as in claim 1, wherein the received signals correspond to a plurality of radar transmitted time-shared PRF's, said step of determining including the steps of:

receiving the conducted signals according to a first PRF and assigning each conducted signal of said first PRF to a corresponding range cell;

receiving the conducted signals according to a second PRF and assigning each conducted signal of said second PRF to a corresponding range cell; and comparing each corresponding range cell of said first and second PRF's and correlating the correspondingly assigned range cells to determine the unambiguous range of the conducted signals.

4. A system for distinguishing target return signals from main beam clutter and discrete sidelobe clutter in a pulse doppler radar receiver, said system comprising:

means for cancelling main beam clutter by rejecting return signals that are doppler shifted within a predetermined frequency range and conducting return signals that are doppler shifted outside the predetermined frequency range;

means for determining the unambiguous range of the conducted return signals, and for providing range gating signals corresponding to the range of the conducted return signals;

means for gating the conducted signals in response to said range gating signals, and for comparing the amplitudes of the conducted signals gated by said gating means with a range varying threshold set to exceed the amplitude of the sidelobe discrete clutter signals and set to be less than the amplitude of the target return signals over the range of the conducted return signals, thereby distinguishing said target return signals from the sidelobe discrete clutter signals.

5. A system as in claim 4 wherein said pulse doppler radar receiver receives return signals for a plurality of pulse repetition frequencies, said unambiguous range determining means including a correlator for correlating said conducted signals of one of said plurality of pulse repetition frequencies with the conducted signals of another one of said plurality of pulse repetition frequencies to determine the unambiguous range; and said gating and comparing means including a range sensitive threshold generator that controls said range varying threshold as a function of the fourth power of the range.

6. A system as in claim 4, wherein said clutter cancelling means is a notch filter.

7. A system as in claim 4, wherein said clutter cancelling means includes a filter bank and a CFAR threshold circuit.

8. A system for distinguishing target return signals from main beam clutter and sidelobe clutter in a medium PRF pulse doppler radar receiver, said system comprising:

means for cancelling main beam clutter by rejecting return signals within a selected doppler frequency range and conducting return signals that are outside of the selected doppler frequency range;

means for envelope detecting said conducted return signals;

means for integrating said conducted return signals detected by said envelope detecting means;

means for thresholding the conducted return signals that are detected by said envelope detecting means and integrated by said integrating means said thresholding means thresholding the signals against a predetermined signal-to-noise ratio;

means for determining the unambiguous range of said thresholded signals and generating range gating signals corresponding to the range of said thresholded signals; and means for comparing the amplitudes of said thresholded signals corresponding to said range gating signals with a range threshold that varies as a function of the range of said thresholded signals, said range threshold being less than the amplitude of target return signals and greater than the amplitude of discrete sidelobe clutter, thereby distinguishing the target return signals from main beam clutter and sidelobe clutter.

9. A system as in claim 8, wherein said clutter cancelling means is a notch filter.

10. A system as in claim 8, wherein said clutter cancelling means includes a filter bank and a CFAR threshold circuit.

11. A method of tracking a target in response to target return signals included in received signals and occurring in predetermined range cells of a pulse doppler radar receiver, said method comprising the steps of:

filtering the received signals to reject signals that are doppler shifted within a predetermined frequency range, and to conduct signals outside the predetermined frequency range;

gating a narrow band filter to scan the conducted signals for each of the predetermined range cells; and monitoring the signals conducted by said narrow band filter and controlling the scanning of said narrow band filter for said predetermined range cells in response to a target return signal conducted through said narrow band filter to discontinue said scanning and initiate tracking said target return signal.

12. A method as in claim 11, further including the steps of:

measuring the changes in the range of the target return signal conducted through said narrow band filter to provide the range and the range rate of the target;

detecting interfering signals having approximately the same doppler frequency as a target return signal, said interfering signals occurring in the same range cell and conducted by said narrow band filter; and inhibiting said gating step while said interfering signals occur, thereby maintaining track of said target return signals.

13. A system for tracking target return signals occurring in predetermined range cells of a pulse doppler radar receiver, said system comprising:

means for cancelling main beam clutter by rejecting return signals having a doppler frequency within a predetermined frequency range and passing return signals having a doppler frequency outside said predetermined frequency range;

means for a narrow band filtering said passed return signals; and means for controlling the center frequency of said narrow band filtering means, said controlling means including means for gating signals corresponding to said predetermined range cells and passed by said narrow band filtering means, said controlling means further including means for sensing a deviation between the gated signals and the center frequency of said narrow band filtering means, and means for generating a control signal to said narrow band filtering means in response to the deviation determined by said sensing means to cause said narrow band filtering means to track said target return signals occurring in said corresponding predetermined range cells.

14. A system as in claim 13, wherein said clutter cancelling means is a notch filter.

15. A system as in claim 13, wherein said clutter cancelling means includes a filter bank and a CFAR threshold circuit.

16. A system as in claim 13, wherein said narrow band filtering means includes a complex video mixer and a low-pass delay line filter.

17. A system as in claim 13, wherein said error sensing means is a zero frequency discriminator circuit.

18. A system as in claim 13, further comprising:

means for measuring the changes in the range of the target return signal conducted through said narrow band filter means to provide the range and the range rate of the target; and means for detecting interfering signals having approximately the same doppler frequency as a target return signal, said interfering signals occurring in the same range cell and conducted by said narrow band filtering means; and producing a signal to inhibit said gating means when said interfering signals are detected, thereby maintaining track of said target return signals.

19. A system for distinguishing and tracking target return signals in a pulse doppler radar receiver, said system comprising:

means for controlling main beam clutter by rejecting return signals having a doppler frequency within a predetermined frequency range and passing return signals having a doppler frequency outside said predetermined frequency range;

a search mode section of said system, said search mode section including means for determining the unambiguous range of the passed return signals, and for providing range gating signals corresponding to the range of the passed return signals; means for gating the passed signals in response to said range gating signals, and for comparing the amplitude of the signals gated by said gating means with a range varying threshold set to exceed the amplitude of the sidelobe discrete clutter signals and set to be less than the amplitude of the target return signals over the range of the passed return signals, thereby distinguishing said target return signals from the sidelobe discrete clutter signals;

a tracking mode section of said system, said tracking mode section including means for narrow band filtering said passed return signals, means for controlling the center frequency of said narrow band filtering means, said controlling means including means for gating signals corresponding to said predetermined range cells and passed by said narrow band filtering means, said controlling means further including means for sensing a deviation between the gated signals and the center frequency of said narrow band filtering means and means for generating a control signal to said narrow band filtering means in response to the deviation determined by said sensing means to cause said narrow band filtering means to track said target return signals occurring in said corresponding predetermined range cells; and means for switching the operation of said system between said search mode and said tracking mode.

* * * * *